United States Patent [19]

Yokajty et al.

[11] Patent Number: 4,903,907

[45] Date of Patent: Feb. 27, 1990

[54] WEB WINDING APPARATUS

[75] Inventors: Joseph Yokajty; Michael Long, both of Rochester, N.Y.

[73] Assignee: Eastman Kodak Company, Rochester, N.Y.

[21] Appl. No.: 242,568

[22] Filed: Sep. 12, 1988

[51] Int. Cl.$^4$ .................. B65H 19/26; B65H 23/24
[52] U.S. Cl. ..................... 242/56 R; 226/97
[58] Field of Search ............... 242/56 R, 55; 226/95, 226/97; 352/222

[56] References Cited

U.S. PATENT DOCUMENTS

| | | | |
|---|---|---|---|
| 2,940,232 | 6/1960 | Wallace et al. | 53/116 |
| 3,273,953 | 9/1966 | Davee | 352/222 |
| 3,567,093 | 3/1971 | Johnson | 226/97 |
| 3,748,033 | 7/1973 | Harvey | 352/222 X |
| 4,182,472 | 1/1980 | Peekna | 226/97 |
| 4,197,972 | 4/1980 | Daane | 226/97 |
| 4,288,015 | 9/1981 | Curtin | 226/97 |
| 4,322,026 | 3/1982 | Young, Jr. | 226/97 X |
| 4,342,413 | 8/1982 | Reba | 226/97 |
| 4,361,029 | 11/1982 | Platter | 226/97 X |
| 4,411,503 | 10/1983 | Bailey et al. | 352/222 |
| 4,438,724 | 3/1984 | Doehler et al. | 226/97 X |

FOREIGN PATENT DOCUMENTS

| | | | |
|---|---|---|---|
| 0044814 | 1/1982 | European Pat. Off. | 242/56 R |
| 0102744 | 6/1984 | Japan | 242/56 R |
| 0118649 | 7/1984 | Japan | 242/56 R |

OTHER PUBLICATIONS

I.B.M. Technical Disclosure Bulletin by R. V. Rogers 9/1962.

Primary Examiner—Joseph J. Hail, III
Attorney, Agent, or Firm—G. Herman Childress

[57] ABSTRACT

A winding apparatus for a web, such as photographic film, advances the web through a cutting mechanism and along a fixed guide to a spool. After the end of the web is attached to the spool, the spool is rotated to wind convolutions of the web onto the spool. The spool is rotated in a direction which causes the web to move away from fixed guide due to the increase in the diameter of the web on the spool as each convolution of the web is wound onto the spool. Air under pressure is directed from an air bar against the web to locate the portion of the web adjacent the cutting mechanism in a position where it is not scratched by the cutting mechanism as it is wound onto the spool. The air bar also urges the web toward the fixed guide when the leading end of the web is advanced from the cutting mechanism into the space between the air bar and the fixed guide as it is driven to the spool for initial attachment to the spool.

1 Claim, 2 Drawing Sheets

WEB WINDING APPARATUS

BACKGROUND OF THE INVENTION

The present invention relates to an improved web winding apparatus, and more specifically, to such an apparatus in which fluid under pressure is used to control deflection of the web as it is wound onto a spool.

Web winding apparatus of various types are well-known in the art. When winding some webs, especially photographic film, care must be taken to avoid scratching the surface of the film since the scratches may be visible after development of images on the film. Thus contact with the film should be avoided to minimize the possibility of scratching the film.

In one prior film winding apparatus the film is advanced along a path leading through a cutting mechanism and between film guides to a spool. After the leading end of the film is attached to the spool, the spool is rotated to wind a number of convolutions of the film onto the spool. Then the film is cut, the wound spool is moved away from the winding apparatus and a new spool is moved into place for winding film onto the spool. The leading end of the film is then driven from the cutting mechanism through the film guides to the new spool for attachment to the spool.

In such prior apparatus the film guides comprise a first guide that extends the full width of the film and is located adjacent one surface of the film, and a pair of movable edge guides located adjacent the opposite surface of the film only in the area along the lateral edges thereof that are outside the normal image area of the film. As the film is wound onto the spool the spool is rotated in a direction which brings the film into contact with the edge guides due to the gradual increase in the diameter of the film on the spool as each new convolution of the film is wound onto the spool. As a result, some scratching of the film can occur on the second surface of the film due to the wiping of that surface against the edge guides. Since the guides only contact the film outside the image area, this does not adversely affect images formed on the film. However, some photographers may notice the scratching in this area and be concerned that some scratching also has occurred in the image area. While the spacing between the fixed guide and the movable guides could be changed to enable the film to be out of contact with the movable guides during winding of film on the spool, this would change the path of the film through the cutting mechanism and cause the film to wipe along an edge of the cutting mechanism, thereby scratching the image area of the film. Accordingly it is desirable to provide an improved web winding apparatus which avoids contact with the film in the area between the cutting mechanism and the spool but which maintains the film path through the cutting mechanism in a plane which avoids scratching of the film in that area, while at the same time enabling the film path near the spool to change in response to the increasing diameter of the film on the spool during winding of film onto the spool.

SUMMARY OF THE INVENTION

Accordingly, it is an object of the invention to provide an improved web winding apparatus wherein undesirable scratching of the web is avoided and, in particular, to such an apparatus that avoids scratching of film in the image area or outside the image area. Another object of the invention is to provide apparatus for guiding film from a cutting mechanism to a spool and for controlling movement of the film in this area by a non-contact guide that avoids scratching of the film.

The present invention relates to an improvement in an apparatus for winding a plurality of convolutions of a web onto a spool in response to rotation of the spool. The apparatus has a web cutting mechanism spaced from the spool and a guide between the cutting mechanism and the spool defining one side of a path along which the web can be advanced from the cutting mechanism to the spool prior to attachment of the web to the spool. The spool is rotated in a direction to urge the web away from the guide as the web is wound onto the spool web to an increase in diameter of the web on the spool as each successive convolution of the web is wound onto the spool. The improvement comprises a web deflecting member located in spaced relation to the web guide. The portion of the web between the cutting mechanism and the spool has a first surface facing the deflecting member and a second surface facing the guide. The web deflecting member has means for directing a fluid under pressure against the first surface of the web to hold the web away from the deflecting member but without forcing the web against the guide while the web is wound onto the spool.

The invention, and its objects and advantages, will become more apparent in the detailed description of the preferred embodiment presented below.

BRIEF DESCRIPTION OF THE DRAWINGS

In the detailed description of the preferred embodiment of the invention presented below reference is made to the accompanying drawings, in which.

DETAILED DESCRIPTION OF THE INVENTION

Figure 1:
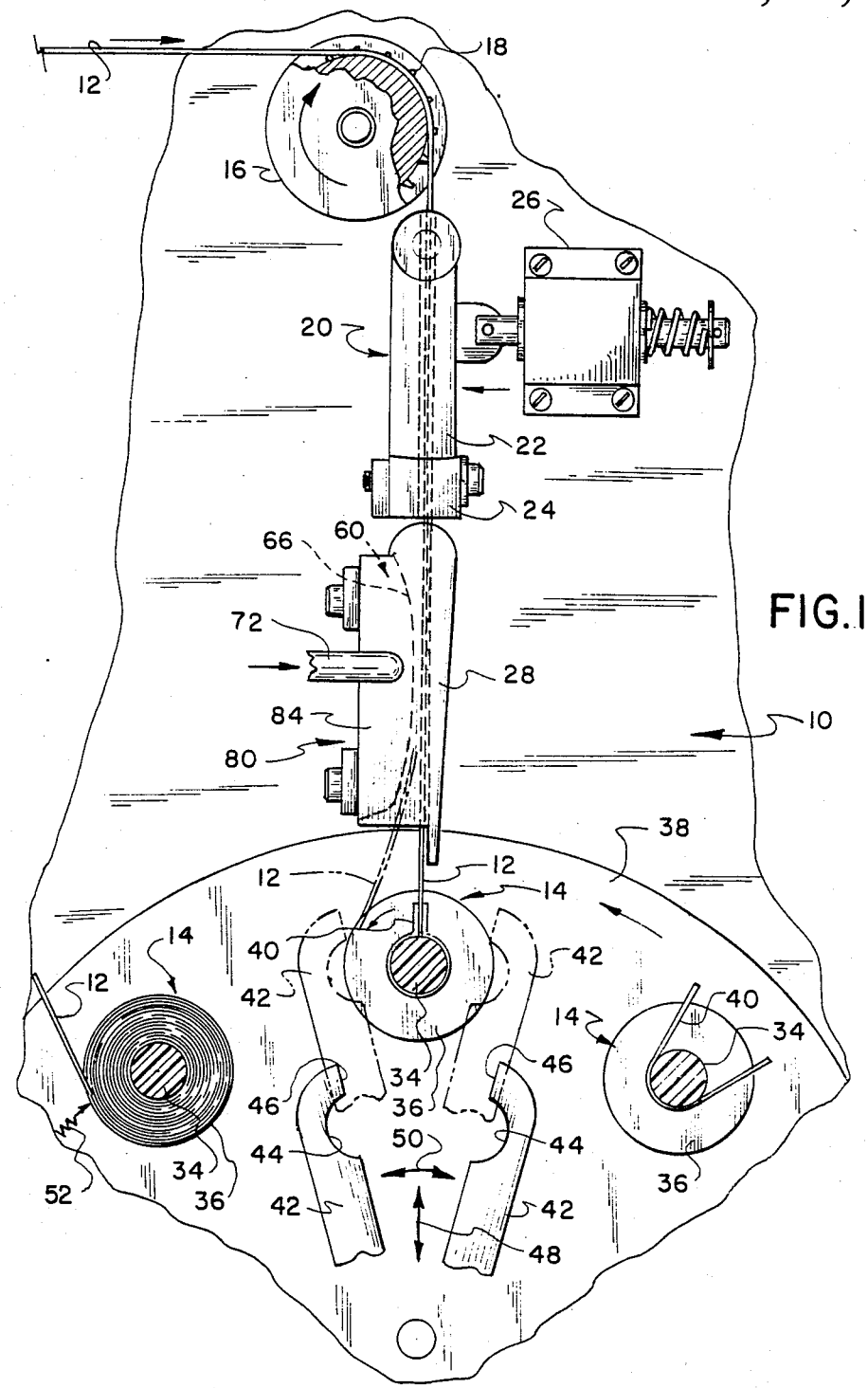
FIG. 1 is an elevation view of a preferred embodiment of a web winding apparatus of the invention.

A preferred embodiment of a web winding apparatus of the invention is generally designated 10 in the drawings. The apparatus will be described in connection with the winding of a strip of photographic film 12 onto a spool 14; however, it will be understood that the apparatus is useful for winding other types of webs onto spools.

Referring to FIG. 1, the film 12 is advanced from a roll of film (not shown) and is guided around a web metering device 16. The metering device has a plurality of sprocket teeth 18 which enter sprocket holes along one or both side edges of the film. As the film leaves the metering device it passes through a slot in a web cutting mechanism generally designated 20. The cutting mechanism includes an upper portion 22 that is moved relative to a lower portion 24 in response to actuation of a solenoid 26 to move the film across a cutting edge on the lower portion 24, thereby severing the film. This operation occurs after a predetermined length of film has been wound onto a spool 14. Then the film is driven by metering device 16 through the lower portion 24 of the cutting mechanism to a new spool for winding thereon as described in more detail later.

Figure 3:
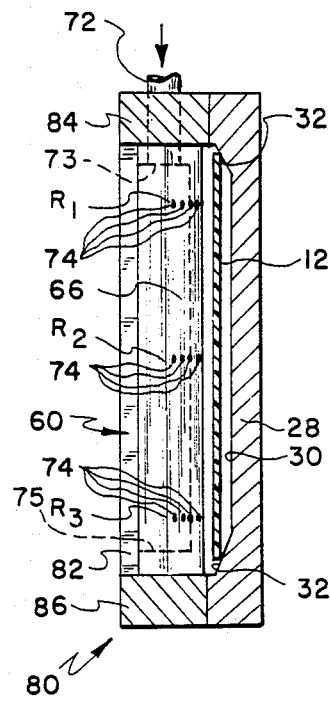
FIG. 3 is a cross section view taken along line 3-3 of FIG. 2.
Figure 2:
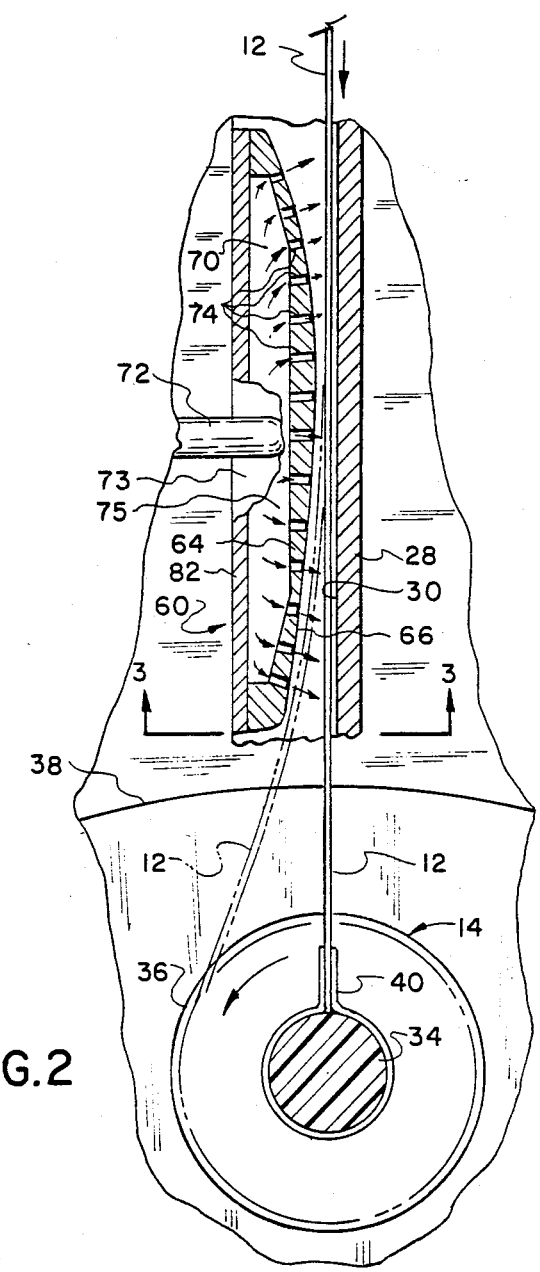
FIG. 2 is an enlarged fragmentary view of the FIG. 1 apparatus with portions of the apparatus being shown in section.

As the film leaves the bottom end of the cutting mechanism 20 it travels along a wide, fixed guide 28 having a generally flat surface 30 as illustrated in FIGS. 2 and 3. Preferably the side edges of surface 30 are bevelled as shown at 32 in FIG. 3. The side edges of film 12 can contact the bevelled edges 32 without scratching the film. Due to the relative stiffness of film and the narrow width of the film, the surface of the film facing guide 28 is spaced from the guide, thus avoiding scratching of that surface of the film. The surface of the film facing guide 28 ordinarily is the emulsion surface of the film.

Film spool 14, as illustrated in the drawings, comprises a generally cylindrical film core 34 having a pair of flanges 36 at the ends thereof, only one of which is shown in the drawings. A circular turntable 38 is adapted to receive a plurality of the spools 14 and advance them through a series work stations, including the station where film is wound onto the spool As best illustrated in FIG. 1, at the station ahead of the web winding apparatus a strip of tape 40 can be attached to the film core 34. Preferably the central portion only of the tape is attached to the core at this time with the ends thereof projecting outwardly in a generally V shaped configuration. Then the turntable is indexed counterclockwise to the position the spool immediately beneath guide 28.

After the leading edge of the film 12 is advanced to a position where it contact the film core 34, the ends of the tape are brought into engagement with the film to attach the film to the spool. This can be accomplished by a pair of tape squeezers 42 having semi-circular recesses 44 and flat surfaces 46. The squeezers are moved between the solid line position and the dotted line position shown in FIG. 1, as shown by arrow 48. When the squeezers are in the dotted line position they can be moved toward and away from each other as shown by the arrow 50. As the squeezers are moved toward each other, the recesses 44 and surfaces 46 bring the free ends of the tape into contact with the core 34 and with the opposite surfaces of the film 12 to attach the film to the core. Then the squeezers are retracted through the dotted line position to the solid line position.

When the film is attached to the spool, the spool can be driven in a counterclockwise direction about the axis of core 34 by a suitable mechanism (not shown) to wind a number of convolutions of the film onto the core. After the film winding operation is completed the spool is advanced to the left position illustrated in FIG. 1 while the film is held tightly onto the core by a gripper shown diagramatically at 52. Then the roll of film can be loaded into a cassette, covered with a wrapping of light-tight paper or otherwise prepared for delivery to a customer. The full spool is removed and replaced with an empty one, and the process repeated.

Apparatus described hereinbefore is substantially the same as the prior web winding apparatus described in the beginning of this specification. In accordance with the present invention the web guides which previously contacted the side of the film opposite from guide 28 along the marginal side edges thereof to prevent bending of the film at the exit of the cutting mechanism 20 has been replaced with an air bar generally designated 60.

A holder 80 for the air bar (described in more detail later) has a flat wall 82 at the back side of the air bar, and end walls 84, 86 along side the air bar. Wall 82 is substantially flat and generally parallel to guide 28. A curved front wall 64 of the air bar has a surface 66 that faces the surface 30 of the fixed guide 28, but is spaced from surface 30. Surface 66 is substantially the same width as surface 30 of guide 28, and is slightly wider than the film strip 12. Surface 66 is generally semi-cylindrical in shape and preferably has a relatively large radius of curvature. For example, surface 66 can have a radius of curvature of about 6 inches.

Preferably the axis of curvature of surface 66 extends in a direction substantially perpendicular to the film path between the metering device 16 and the air bar. Thus the upper and lower ends of surface 66 are spaced from surface 30 of guide 28 by a distance that is greater than the spacing between the surface 30 and the center portion of surface 66. As shown in FIG. 3, the spacing between surface 66 and surface 30 is the same throughout the width of the surface and the film 12. The upper and lower ends of wall 64 are attached to rear wall 82 of the holder 80. Other portions of the walls 64 and 82 are spaced from each other.

The air bar has a manifold 70 that is connected by a conduit 72 to a source of air or other fluid under pressure. The manifold is defined by walls 64, 82 and sidewalls 73, 75 of the air bar. Wall 64 has a plurality of air outlet openings 74 that are substantially perpendicular to a tangent to surface 66 at the point where the openings extend through that surface. Preferably, there are three parallel rows R1, R2 and R3 (FIG. 3) of the openings 74 and the rows are parallel to the film path between the cutting mechanism and the spool. Row R2 is located substantially along the vertical center line of the air bar. Rows R1 and R3 are preferably equally spaced from the center row R2, and also are equally spaced from the side edges of the air bar. Rows R1, R3 are nearer to the side edges of the air bar than they are to center row R2.

The air bar holder 80 supports the air bar and establishes its position relative to the guide 28. As indicated earlier, the holder has a flat wall 82 located along the back of the air bar, and a pair of end walls 84, 86 that extend along the side walls 73, 75, respectively, of the air bar. The outermost ends of the end walls 84, 86 engage lateral side edges of the fixed guide 28. As a result of this mounting, there is a small narrow space between surface 30 of fixed guide 28 and the surface 66 of the air bar even at the point where the air bar is nearest to the fixed guide surface 30. As shown in FIG. 3, this space is generally rectangular in cross-section and is slightly wider and longer than the thickness and width, respectively, of the film 12 even where the air bar is nearest to surface 30 of the fixed guide.

Operation of the web winding apparatus will now be described. Initially it will be assumed that a strip of film 12 has been cut by the cutting mechanism so that the leading edge of the film is between portions 22, 24 of the cutting mechanism. It will also be assumed that the spool 14 directly below guide 28 and air bar 60 is an empty spool having a tape 40 thereon with the ends projecting outward to define a V-shaped slot for receiving the leading end of the film, as shown in FIG. 1 for the spool at the right on turntable 38.

The film metering device 16 is driven to advance the leading end of the film through the space defined by the fixed guide 28 and the air bar 60 and into contact with the hub 34 of the film spool. At this time air under pressure is provided through conduit 72 into the manifold 70 in the air bar and then through the openings 74. Air leaving openings 74 strikes the adjacent surface of the film to urge the film to the right as viewed in the drawings and toward surface 30 of the fixed guide. This brings the lateral side edges of the film into contact with the bevelled edges 32 (FIG. 3) of the fixed guide, thus positively locating the film with respect to guide 28 while maintaining the surface of the web spaced slightly from the surface 30 of the guide 28. The film travels along substantially a straight line path in a plane parallel to surface 30 of the guide 28 from the point where it leaves metering device 16 to the point where it contacts spool hub 34. When the film is in this plane, there are no edges that will scratch the film.

After the leading end of the film contacts the hub 34 of the spool the tape squeezers move from their solid line position to their dotted line position and then toward each other to bring the ends of the tape 40 against the leading end of the film and thereby attach the film to the spool. Then the tape squeezers are moved away from each other to the dotted line position and retracted to the solid line position shown in FIG. 1.

Next spool 14 is driven in a counterclockwise direction as viewed in the drawings to wind a number of convolutions of the film around the hub. This gradually increases the diameter of the film roll on the hub. As this occurs, the portion of the film between the spool 14 and the fixed guide 28 gradually moves to the left from the position shown in solid lines and FIGS. 1 and 2 to the position shown in phantom. In the absence of the air bar 60, such movement would cause the surface of the film to be drawn across the edge of portion 24 of the cutting mechanism at the point where the film leaves the bottom of the cutting mechanism. This would scratch the surface of the film and cause it to be unsuitable for use.

As the film is being wound onto the spool air from manifold 70 of the air bar passing through openings 74 creates a boundary layer of air under pressure between the air bar and the adjacent surface of the film 12. This thin film of air is sufficient to prevent contact between the film and the air bar thereby avoiding scratching of the film. At the same time, the portion of the film between the center of the air bar as viewed in FIG. 2 and the cutting mechanism remains in a substantially straight path which enables the film to exit from the cutting mechanism without engaging the adjacent edges of the cutting mechanism and becoming scratched. As the film is pulled close to the surface 66 of the air bar during winding of film onto the spool the pressure exerted by the air becomes greater and thereby assures feeding of the film past the air bar without contact with the air bar. Moreover, the air pressure is not great enough to force the film against surface 30 of the guide 28. Thus the non-contact type film guide provided by the air bar is effective to avoid scratching of the film through a wide range of relative positions of the film during winding of the film onto the spool.

A number of advantages are achieved by the invention. First of all the positive air pressure created by the air bar is effective to locate the web adjacent to the stationary guide 28 during the film feed operation preceding attachment of the leading end of the film to the spool. It is important that the film be accurately controlled at this time so that the leading end is directed into the space between the ends of the tape used for attaching the film to the guide. Moreover, the non-contact method of guiding the film between the air bar and the fixed guide is effective throughout the winding cycle to maintain separation between the surface of the film and the air bar even though the direction taken by the film as it leaves the space between guide 28 and the air bar changes significantly during winding of film onto a spool. This change in film path below the center of the air bar occurs without significant change in the film path between the air bar and the film metering member 16. In addition, the apparatus of the invention is relatively simple to manufacture, easy to assemble, and the guiding mechanism does not have any moving parts thereby minimizes maintenance and repair. Moreover, the apparatus is particularly desirable for use in winding and spooling mechanism where very little space is available for the mechanism.

The invention has been described in detail with particular reference to a preferred embodiment thereof but it will be understood that variations and modifications can be effected within the spirit and scope of the invention.

We claim:

1. In an apparatus for winding a plurality of convolutions of a web or film onto a spool in response to rotation of the spool, the apparatus having a cutting mechanism spaced from the spool and a guide between the cutting mechanism and the spool defining one side of a substantially straight path along which the film can be advanced from the cutting mechanism to the spool prior to attachment of the film to the spool, and the spool being rotated in a direction to urge the film away from the guide as the film is wound onto the spool due to an increase in diameter of the film on the spool as each successive convolution of the film is wound onto the spool, the improvement comprising:

an air bar located along the film path between the cutting mechanism and the spool and located on the opposite side of the path from the guide, the air bar having a substantially semi-cylindrical surface directly opposite the guide and facing the path, the axis of curvature of the surface extending in a direction substantially perpendicular to the film path, the center portion of the air bar surface being nearer to the guide than other portions of the air bar surface, means defining an air manifold in the air bar, means for connecting the manifold to a source of air under pressure, and a plurality of openings in the air bar between the manifold and the air bar surface located so that air under pressure leaving the openings is directed toward the film path to hold the film substantially straight in the portion of the path between the cutting mechanism and the center portion of the air bar while enabling limited movement of the film toward the air bar surface between the center portion of such surface and the spool in response to an increase in the diameter of the film on the spool during winding of the film onto the spool, the openings in the air bar being arranged in a plurality of substantially parallel rows extending in a direction substantially parallel to the film path.

* * * * *